United States Patent
Oda et al.

(10) Patent No.: US 12,473,605 B2
(45) Date of Patent: Nov. 18, 2025

(54) METHOD FOR PRODUCING LOW-CARBON FERROMANGANESE

(71) Applicants: JFE STEEL CORPORATION, Tokyo (JP); JFE MINERAL & ALLOY COMPANY, LTD., Tokyo (JP)

(72) Inventors: Nobuhiko Oda, Tokyo (JP); Yusuke Fujii, Tokyo (JP); Shingo Sato, Tokyo (JP); Ryo Kawabata, Tokyo (JP); Naoki Kikuchi, Tokyo (JP); Toshio Shiota, Tokyo (JP); Ippei Higuchi, Tokyo (JP)

(73) Assignees: JFE STEEL CORPORATION, Tokyo (JP); JFE MINERAL & ALLOY COMPANY, LTD., Tokyo (JP)

( * ) Notice: Subject to any disclaimer, the term of this patent is extended or adjusted under 35 U.S.C. 154(b) by 529 days.

(21) Appl. No.: 17/802,389

(22) PCT Filed: Feb. 16, 2021

(86) PCT No.: PCT/JP2021/005689
§ 371 (c)(1),
(2) Date: Aug. 25, 2022

(87) PCT Pub. No.: WO2021/177021
PCT Pub. Date: Sep. 10, 2021

(65) Prior Publication Data
US 2023/0167518 A1    Jun. 1, 2023

(30) Foreign Application Priority Data

Mar. 6, 2020    (JP) .................................. 2020-038790

(51) Int. Cl.
*C21C 7/068*    (2006.01)
*C21C 5/35*    (2006.01)
(Continued)

(52) U.S. Cl.
CPC ................ *C21C 7/068* (2013.01); *C21C 5/35* (2013.01); *C21C 5/36* (2013.01); *C22C 33/06* (2013.01); *C22C 35/005* (2013.01)

(58) Field of Classification Search
CPC .. C21C 7/068; C21C 5/35; C21C 5/36; C21C 7/072; C22C 33/06; C22C 35/005; C22C 33/04; C22C 22/00
(Continued)

(56) References Cited

U.S. PATENT DOCUMENTS

| 4,130,417 A |    | 12/1978 | Breuer et al. |
| 4,165,980 A | * | 8/1979 | Breuer .................... C21C 7/068 |
|   |   |   | 75/530 |

(Continued)

FOREIGN PATENT DOCUMENTS

| BE | 873534 A | 7/1979 |
| DE | 37 07 696 A1 | 9/1988 |

(Continued)

OTHER PUBLICATIONS

JP2008240126A Translation (Year: 2008).*

(Continued)

*Primary Examiner* — Danielle M. Carda
(74) *Attorney, Agent, or Firm* — Oliff PLC

(57) ABSTRACT

A method for producing low-carbon ferromanganese capable of achieving a high Mn yield. In producing low-carbon ferromanganese by blowing an oxidizing gas from a top-blowing lance onto a bath face of high-carbon ferromanganese molten metal accommodated in a reaction vessel provided with a top-blowing lance and bottom-blowing tuyere to perform decarburization, the slag composition during the blowing is adjusted so that a value of ($CaO+MgO)/(Al_2O_3+SiO_2$) on a mass basis in the slag composition is not less than 0.4 but not more than 5.0. Also, agitation is (Continued)

performed under a condition that an agitation power density ε of an agitation gas blown through the bottom-blowing tuyere is not less than 500 W/t.

2 Claims, 1 Drawing Sheet

(51) Int. Cl.
    *C21C 5/36* (2006.01)
    *C22C 33/06* (2006.01)
    *C22C 35/00* (2006.01)
(58) Field of Classification Search
    USPC .......................................................... 75/551
    See application file for complete search history.

(56) References Cited

U.S. PATENT DOCUMENTS

| | | | |
|---|---|---|---|
| 4,192,675 A | | 3/1980 | Featherstone et al. |
| 4,662,937 A | | 5/1987 | Katayama et al. |
| 4,808,220 A | * | 2/1989 | Litterscheidt ......... C22C 33/003 75/543 |

FOREIGN PATENT DOCUMENTS

| | | | |
|---|---|---|---|
| JP | S48-079716 A | | 10/1973 |
| JP | S52-009616 A | | 1/1977 |
| JP | S54-097521 A | | 8/1979 |
| JP | S56-020113 A | | 2/1981 |
| JP | S60-0056051 A | | 4/1985 |
| JP | S60-067608 A | | 4/1985 |
| JP | S61-291947 A | | 12/1986 |
| JP | S62-230951 A | | 10/1987 |
| JP | S63-290242 A | | 11/1988 |
| JP | H01-123047 A | | 5/1989 |
| JP | H01-316437 A | | 12/1989 |
| JP | H02-166256 A | | 6/1990 |
| JP | H02-247313 A | | 10/1990 |
| JP | H11-279630 A | | 10/1999 |
| JP | H11-293332 A | | 10/1999 |
| JP | 2008240126 A | * | 10/2008 |
| WO | 2019/102705 A1 | | 5/2019 |

OTHER PUBLICATIONS

May 10, 2024 Office Action issued in Korean Patent Application No. 10-2022-7030926.

Apr. 23, 2024 extended Search Report issued in European Patent Application No. 21765152.0.

Jan. 18, 2022 Office Action issued in Japanese Patent Application No. 2021-520447.

Mar. 30, 2021 International Search Report issued in Patent Application No. PCT/JP2021/005689.

* cited by examiner

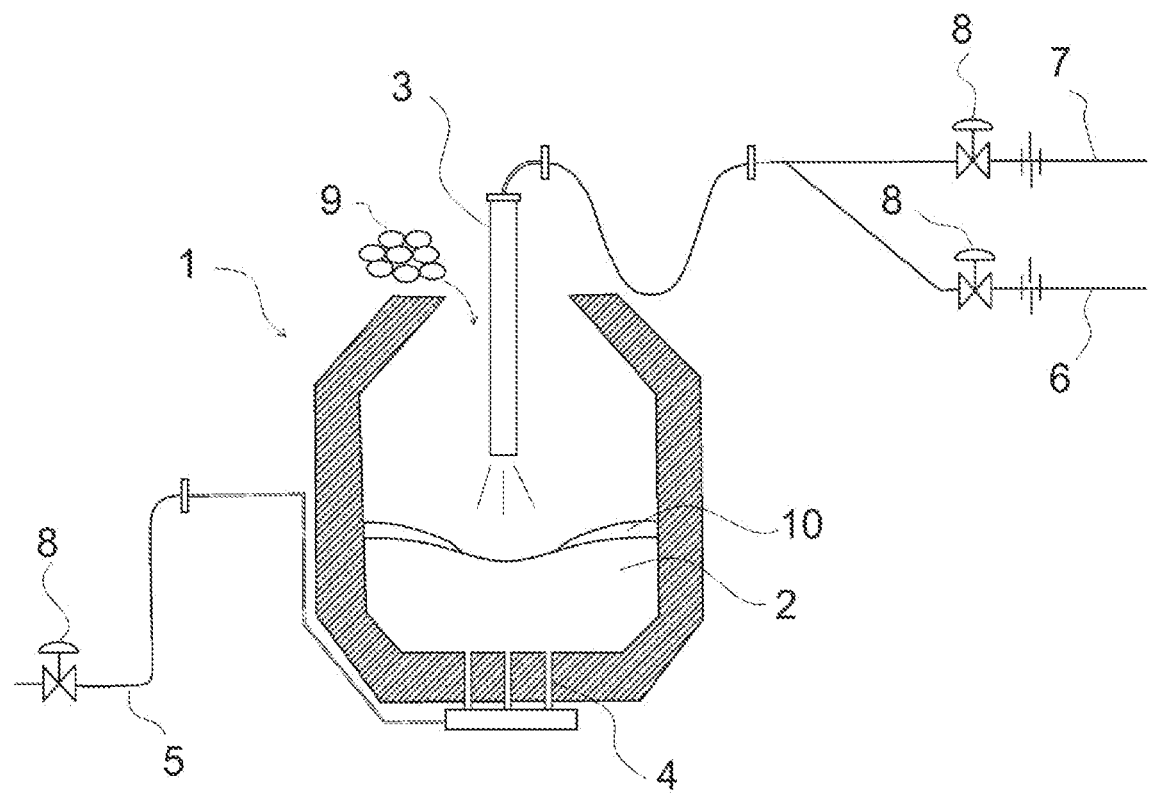

METHOD FOR PRODUCING LOW-CARBON FERROMANGANESE

TECHNICAL FIELD

This invention relates to a method for producing low-carbon ferromanganese.

BACKGROUND

In a converter steelmaking method using a molten iron from a blast furnace as main raw material, a manganese (Mn) ingredient useful as an alloying ingredient for a steel product is added at the end of refining in the converter. Whereas, in an electric furnace steelmaking method using scrap as main material, Mn is added during the melting operation. In both cases, a ferromanganese (FeMn) alloy is commonly used as a manganese ingredient. Such a ferromanganese alloy is classified into high-carbon ferromanganese (HCFeMn), medium-carbon ferromanganese (MCFeMn), and low-carbon ferromanganese (LCFeMn), depending on the carbon concentration, and each chemical composition thereof is defined by Japanese Industrial Standards (JIS) (see Table 1). Note that MCFeMn and LCFeMn are usually produced by using expensive silicon manganese (SiMn) and a large amount of power and thus are far more expensive alloying irons as compared to HCFeMn.

There is a so-called desiliconization method among the conventional methods for producing medium- and low-carbon ferromanganese. This method includes preparing silicon-manganese molten metal having a target carbon content in an electric furnace or the like and adding manganese oxide such as manganese ore or the like to the molten metal thus to remove silicon from the silicon-manganese molten metal by oxidation. This method has a problem of an increase in power costs due to the use of the electric furnace.

To solve such a problem, a method of oxidizing and removing carbon from ferromanganese molten metal by spraying an oxygen gas onto high-carbon ferromanganese molten metal or blowing an oxygen gas into molten metal has been adopted. The decarburization reaction of ferromanganese molten metal is usually represented by following equation (1), and an equilibrium constant K thereof can be represented by the following equation (2).

$$(MnO)+[C]=[Mn]+CO \quad (1)$$

$$K=(a_{Mn} \cdot P_{CO})/(a_{MnO} \cdot a_C) \quad (2)$$

Note that, (R) means that ingredients of chemical formula R are contained in a slag; [M] means that ingredients of an element M are contained in the ferromanganese molten metal; $a_i$ is an activity of an ingredient i; and $P_j$ is a partial pressure (atm) of an ingredient j. The values of equilibrium constant K, $a_{Mn}$, and $a_C$ can be calculated by using thermodynamic data of known literatures. Also, the decarburization limit of the ferromanganese molten metal can be known by determining a relation between an equilibrium [C] concentration and the temperature of the molten metal under conditions of the following equations (3) and (4):

$$a_{MnO}=1 \quad (3)$$

$$P=P_{Mn}+P_{CO}=1 \quad (4)$$

In the equation (4), P is the total pressure (1 atm), and $P_{Mn}$ is equal to a vapor pressure of Mn at the temperature. Note that atm is a unit of pressure in which 1 atm=101325 Pa.

The equations (1) to (4) show that, since the equation (1) is an endothermic reaction, an increase in the temperature of the molten metal, a decrease in the CO partial pressure, and an increase in the activity of MnO in the manganese oxide slag are necessary to proceed the decarburization of the ferromanganese molten metal. In the decarburization of the ferromanganese molten metal conducted at a low carbon region, therefore, as far as blowing is conducted under the atmospheric pressure, the formation of Mn oxide and the generation of manganese vapor are not avoided to a certain level due to not only the high-temperature blowing but also the oxidation of manganese causing a decrease in yield.

As a method for performing refining of high-carbon ferromanganese molten metal by blowing an oxygen gas therein, Patent Literatures 1 and 2 propose a method of removing carbon in molten metal by oxidation by blowing an oxygen gas into high-carbon ferromanganese molten metal from a bottom tuyere of a reaction furnace.

Patent Literature 3 proposes a method of removing carbon in molten metal by oxidation by blowing an oxygen gas thereon from a top-blowing lance while stirring the molten metal by blowing an inert gas from a furnace bottom tuyere.

There is also proposed a method of controlling types and flow rates of top-blowing gas and bottom-blowing gas together with the time for blowing and the temperature of molten metal. For example, Patent Literature 4 proposes a method for decarburization of high-carbon ferromanganese molten metal including blowing an oxygen gas from a furnace bottom tuyere, in which the oxygen gas is mixed with steam and an inert gas to be blown in a low-carbon region.

Patent Literature 5 proposes a decarburization method of high-carbon ferromanganese by blowing an oxygen gas from a top-blowing lance while blowing a mixture of oxygen gas and inert gas from a furnace bottom tuyere to agitate molten metal, in which the flow rates of the bottom-blowing oxygen and the bottom-blowing inert gas are reduced with the advance of the blowing.

Patent Literatures 6 and 7 propose a method of blowing top-blowing oxygen mixed with inert gas.

Moreover, Patent Literatures 8 and 9 propose a method of controlling the composition of slag by adding a slag-making agent thereto. The method is to control the component composition of the slag using manganese oxide such as manganese ore, manganese sintered ore or the like so that the activity of MnO in the slag is nearly 1 during blowing, leading to an increase in Mn yield.

CITATION LIST

Patent Literatures

Patent Literature 1: JP-A-S48-079716
Patent Literature 2: JP-A-S52-009616
Patent Literature 3: JP-A-S60-056051
Patent Literature 4: JP-A-S54-097521
Patent Literature 5: JP-A-S62-230951
Patent Literature 6: JP-A-S61-291947
Patent Literature 7: JP-A-H02-166256
Patent Literature 8: JP-A-H01-316437
Patent Literature 9: JP-A-H11-293332

SUMMARY OF INVENTION

Technical Problem

The methods of Patent Literatures 1 to 3 have the following problem.

That is, manganese is usually strong in affinity with oxygen and is easily oxidized with an oxygen gas to form slag. Manganese is also high in vapor pressure and thus tends to be actively vaporized with the rise of the molten metal temperature to easily scatter toward external as fume dust. In these methods, therefore, simply blowing the oxygen gas into the molten metal or spraying the oxygen gas onto the molten metal causes not only difficulty in decarburization but also a decrease in Mn yield, resulting in such a problem that the middle- and low-carbon ferromanganese cannot be produced economically.

The prior arts disclosed in Patent Literatures 4 to 9 also have the following actual problem to be solved.

For example, in the method of blowing an oxygen gas or a mixture gas of oxygen gas and inert gas from a furnace bottom tuyere (Patent Literatures 4 and 5), high-temperature blowing is essential in the decarburization refining of ferromanganese molten metal, as previously described, and the neighboring area of the tuyere is assumed to be exposed to a higher temperature due to the heat of oxidation reaction by the oxygen gas. Therefore, in these methods, an advanced operation skill is required to prevent leakage of the molten metal due to erosion of the tuyere, and also the service life of the tuyere is considerably decreased as compared to the case of blowing only inert gas, and hence the significant rise of the refractory cost cannot be avoided.

In the method of blowing a mixture of a top-blowing oxygen gas and inert gas to ferromanganese molten metal (Patent Literatures 6 and 7), a hot spot as a site where decarburization is likely to cause at the highest temperature (a position where the top-blowing oxygen gas collides onto the molten metal surface) is cooled by the inert gas. Moreover, the generation of manganese vapor is originally large at the hot spot, assumingly causing a decrease in the CO partial pressure, and therefore the effect of decreasing the CO partial pressures by the inert gas is small. There is another method of decreasing the CO partial pressure inside the reaction furnace by increasing the flow rate of inert gas to be mixed, which is not economical due to higher refining cost when a rare gas such as expensive argon or the like is used as the inert gas.

The methods described in Patent Literatures 8 and 9 take no account of the relation to the composition of another slag, possibly causing insufficient Mn yield.

The invention is made in view of the above problems of the prior arts, and an object thereof is to propose a method for producing low-carbon ferromanganese which can obtain a high Mn yield in decarburization of ferromanganese molten metal conducting by top-blowing an oxidizing gas in a converter-type reaction vessel.

Solution to Problem

The inventors have made various studies on methods for producing low-carbon ferromanganese with a good Mn yield, focusing on the temperature and component of the molten metal and the change of the slag composition. As a result, they have found that a high Mn yield can be obtained by controlling the slag composition in decarburization of ferromanganese molten metal in the converter-type reaction vessel conducted by top-blowing the oxidizing gas to thus reduce MnO in the slag effectively, and thus the invention has been accomplished. That is, the invention proposes a method for producing low-carbon ferromanganese comprising blowing an oxidizing gas onto a bath face of high-carbon ferromanganese molten metal contained in a reaction vessel provided with a top-blowing lance and bottom-blowing tuyere, from the top-blowing lance for decarburization, in which a slag composition during the blowing is adjusted so that a value of $(CaO+MgO)/(Al_2O_3+SiO_2)$ on a mass basis in the slag composition is not less than 0.4 but not more than 5.0.

The method for producing low-carbon ferromanganese according to the invention having the above configuration has more preferable embodiments as follows:
  a. an agitation gas is blown from the bottom-blowing tuyere to have an agitation power density of not less than 500 W/t;
  b. an auxiliary material containing MgO is added before the start of the blowing or during the blowing.

Advantageous Effects of Invention

According to the invention, the slag composition is optimized in refining of ferromanganese molten metal conducted by blowing an oxidizing gas thereon, so that MnO in the slag can be reduced with carbon in the molten metal efficiently, leading to a high Mn yield. Also, according to the invention, a higher Mn yield can be obtained by optimizing the agitation power density of the bottom-blowing gas.

BRIEF DESCRIPTION OF DRAWINGS

FIG. 1 is a schematic view of an equipment used in an embodiment of the invention.

DESCRIPTION OF EMBODIMENTS

FIG. 1 shows an example of effective equipment for performing the method of the invention. There will be described the method of decarburization-refining of high-carbon ferromanganese (HCFeMn) with reference to FIG. 1 below. FIG. 1 shows that melted high-carbon ferromanganese molten metal 2 is charged into a reaction vessel 1 as an example of a top-bottom blown converter. An oxidizing gas is blown from a top-blowing lance 3 onto the bath face of the molten metal 2 in the vessel. Note that the oxidizing gas means pure oxygen gas or oxygen mixed gas. Whereas, a non-oxidizing gas is blown into the molten metal 2 from a bottom-blowing tuyere 4, to which a pipe 5 for introducing the non-oxidizing gas is connected. In the example shown in FIG. 1, flow control valves 8 are provided both in a pipe 6 and pipe 7 for introducing the non-oxidizing gas and the oxygen gas, respectively, into the top-blowing lance 3. Note that various types of additives 9 can be charged from a furnace throat during the blowing. The molten metal 2 has slag 10 formed thereon. The additive 9 can use an auxiliary material containing MgO, ferromanganese as a cooling material, and the like. A Laval nozzle is preferably used as the top-blowing lance 3. When a plurality of nozzles are used, they are preferably arranged in rotation symmetry to the axis of the lance. Further, the top-blowing lance 3 is preferable to use a multiport lance, leading to a wider hot spot area than a single port lance and efficient blowing of oxygen to the molten metal, and is thus suitable for the mass production.

In the method for producing low-carbon ferromanganese according to the invention, the molten metal 2 of high-carbon ferromanganese is first charged into the reaction vessel 1. From before the charging of the molten metal 2 to during the refining thereof, a required amount of non-oxidizing gas is blown into the molten metal 2 from the bottom-blowing tuyere 4 to agitate the molten metal 2. Thereafter, the top-blowing lance 3 is descended from above to spray an oxidizing gas onto a bath face of the molten metal 2 to thus start decarburization blowing. If necessary, an auxiliary material containing MgO may be added before the start of the blowing.

The oxidizing gas blown from the top-blowing lance 3 can use an oxygen gas or oxygen mixed gas obtained by mixing oxygen gas with not more than 30 vol % non-oxidizing gas; Ar is preferable as the non-oxidizing gas to be mixed. From the viewpoint of securing the temperature of the hot spot, the oxidizing gas for top-blowing is preferably oxygen mixed gas containing not more than 10 vol % non-oxidizing gas, more preferably pure oxygen gas. Whereas, the non-oxidizing gas to be blown from the bottom-blowing tuyere is preferably Ar, CO, $CO_2$, or a mixture gas thereof from the viewpoint of efficient agitation without increasing nitrogen concentration in the molten metal.

According to the invention, the slag composition is adjusted so that a value of $(CaO+MgO)/(Al_2O_3+SiO_2)$ on a mass basis in the slag composition during blowing is not less than 0.4 but not more than 5.0 in the above operation. If necessary, an auxiliary material such as an alloy, quicklime, dolomite or the like, Mn ore, blast furnace slag, and so on may be added properly for the adjustment of the composition of the slag 10. When the value of $(CaO+MgO)/(Al_2O_3+SiO_2)$ is less than 0.4 or exceeds 5.0, a solid phase rate of the slag 10 increases. As a result, the viscosity of the slag increases to lower the fluidity thereof, failing to reduce MnO in the slag 10 into the molten metal efficiently, and hence such a value is not preferable. A more preferable lower limit is not less than 1.0 while a more preferable upper limit is not more than 3.0. The composition of the slag during blowing is the one obtained when the slag is sufficiently formed, and it can be confirmed by analysis at the end of the blowing.

The activity of MnO represented with $a_{MnO}$ can be kept at a high level by adjusting the slag composition such that $MnO/(MnO+CaO+Al_2O_3+MgO+SiO_2)$ on a mass basis is not less than 0.6, whereby MnO in the slag 10 can be reduced into the molten metal at a higher efficiency. The upper limit is not particularly limited, but is less than 1.0.

In the above operation, it is preferable to feed bottom-blowing gas to the molten metal 2 from the tuyere 4 under a condition that an agitation power density ε of the molten metal 2 represented by the following equation (5) is not less than 500 W/t, to accelerate the decarburization reaction during the blowing. The reason is that conducting agitation of the molten metal at a proper agitation power density promotes the slag-metal reaction, enabling Mn oxide (MnO) in the slag 10 to be recovered in the molten metal. More preferably, the agitation power density is not less than 600 W/t. Whereas, even if a larger amount of bottom-blowing gas is blown, the bottom-blowing gas effectively contributing to the agitation of the molten metal is usually decreased due to blow-out, so that a maximum value of the agitation power density is about 1000 W/t.

$$\varepsilon=6.183\times(Q\times T_l/(60\times W))\times[\ln\{1+h/(1.02\times10^{-4}\times(101325\times P))\}+\{1-(T_g/T_l)\}] \quad (5)$$

Note that, ε represents the agitation power density (W/t) of the bottom-blowing gas; Q represents the flow rate ($Nm^3/h$) of the bottom-blowing gas; W represents the amount (t) of the ferromanganese molten metal; $T_l$ represents the temperature (° C.) of the ferromanganese molten metal; $T_g$ represents the temperature (° C.) of the bottom-blowing gas; h represents the bath depth (distance from the bath face to the bottom of the reaction furnace at rest) (m); P represents the atmospheric pressure (1 atm).

The blowing of the oxidizing gas from the top-blowing lance 3 is preferably conducted such that the flow velocity of the oxidizing gas when arriving at the bath face calculated by the following equations (6) to (9) is not less than 70 m/s but not more than 150 m/s. This is due to the fact that the operation within the above range enables blowing while suppressing the scattering of the molten metal without oxygen being blocked by the vapor of Mn (fume), thus improving the decarburization efficiency of oxygen to provide a high Mn yield. More preferably, blowing is operated so that the flow velocity when arriving at the bath face falls within a range of not less than 80 m/s to not more than 130 m/s.

$$F_{o2}=0.456\blacksquare n\blacksquare d^2\blacksquare(P_0/0.97) \quad (6)$$

$$U_0=740\{1-(P_e/P_0)^{2/7}\}^{1/2} \quad (7)$$

$$U/U_0=D/2CL \quad (8)$$

$$C=0.016+0.19/((P_0/0.97)-1.034) \quad (9)$$

Note that, $F_{O2}$ represents the flow rate ($Nm^3/h$) of the oxidizing gas from the top-blowing lance; n represents the nozzle number (nozzles) of the top-blowing lance; d represents the throat size (mm) of the nozzle of the top-blowing lance; $P_0$ represents the pressure (atm) of the oxidizing gas at the nozzle inlet of the top-blowing lance; $P_e$ represents the pressure (atm) of the oxidizing gas at the nozzle outlet of the top-blowing lance; $U_0$ represents the blowing velocity (m/s) of the oxidizing gas from the top-blowing lance; U represents the flow velocity (m/s) of the oxidizing gas when arriving at the bath face from the top-blowing lance; L represents the lance height (distance from the outlet of the nozzle in the top-blowing lance to the bath face at rest) (mm); D represents the outlet size (mm) of the nozzle of the top-blowing lance; C represents a constant (-) that represents the spreading of the oxidizing gas jet.

From the viewpoint of preventing wear damage of the refractory, suppressing evaporation of Mn, and preventing slowdown of the decarburization rate, it is preferable to operate at the temperature of the ferromanganese molten metal $T_l$ of not higher than 1700° C. when the carbon concentration of the molten metal [C] is not less than 2.0 mass % and of not higher than 1750° C. when [C] is not less than 1.5 mass % but less than 2.0 mass %. In order to maintain the molten metal temperature within the above range, it is effective to add an auxiliary material such as alloy, quicklime, dolomite or the like, Mn ore, slag, and so on as a cooling material 9 during the decarburization refining, if necessary. In this case, if the slag volume is increased beyond suppression of Mn evaporation, the migration of Mn into the slag is increased, causing a decrease in the Mn yield. Therefore, the cooling material is preferably crushed scrap of FeMn, more preferably MCFeMn or LCFeMn. However, the control of the operating temperature using such crushed scrap is not preferable from the viewpoint of accelerating the decarburization reaction, because the molten metal is locally cooled by the addition of the cooling material. Therefore, when using the crushed scrap to control the molten metal temperature, it is desirable to decrease the use amount as low as possible. Also, adding the auxiliary material containing MgO before the start of the blowing or during the blowing enables the erosion of the bricks to be decreased, leading to an increase in the service life of the refractory. The auxiliary material containing MgO may include MgO ball (material formed by sintering dolomite or magnesite, pulverized, and then fixed with cement) and magnesite (ore composed mainly of magnesium carbonate).

The top-blowing lance is uplifted to stop the blowing of the oxidizing gas after decarburization is performed up to a given carbon concentration. After the uplifting of the top-blowing lance 3, it is preferable to recover Mn oxide (MnO) in the slag by adding reducing material such as FeSi, SiMn, or the like while agitating by the bottom-blowing gas.

EXAMPLE

This example is a case where 25 t of high-carbon ferromanganese (HCFeMn) molten metal was charged into a top and bottom blown type cylindrical refining furnace having an inner diameter of about 2.3 m to conduct decarburization refining. The used HCFeMn corresponds to the case No. 2 shown in Table 1 (Mn: 73 mass %, C: 6.9 mass %), in which a temperature immediately after the charging was 1334 to 1341° C. In the operation (blowing), pure $O_2$ was blown on the molten metal from a top-blowing lance, while Ar was blown therein from a bottom-blowing tuyere for agitation. The oxygen flow rate was 40 $Nm^3$/min from the start of the refining to the end thereof. In the blowing, 500 kg of crushed scrap of MCFeMn (Mn: 80 mass %, C: 1.5 to 2.0 mass %) and 450 kg of crushed scrap of LCFeMn (Mn: 80 mass %, C: 0.5 to 1.0 mass %) were added. In this operation, lime, silica, band shale, and dolomite were added to change the slag composition for the decarburization refining of the high-carbon ferromanganese molten metal, if required. Table 2 shows the result. Note that the blowing was stopped when the carbon concentration [C] in the ferromanganese molten metal reached 0.5 mass % as an endpoint.

TABLE 1

| Type | | Symbol | Component composition (mass %) | | | | |
|---|---|---|---|---|---|---|---|
| | | | Mn | C | Si | P | S |
| High-carbon ferromanganese (HCFeMn) | 0 | FMnH0 | 78 to 82 | <7.5 | <1.2 | <0.4 | <0.02 |
| | 1 | FMnH1 | 73 to 78 | <7.3 | <1.2 | <0.4 | <0.02 |
| | 2 | FMnH2 | 73 to 78 | <7.0 | <3.0 | <0.4 | <0.02 |
| Medium-carbon ferromanganese (MCFeMn) | 0 | FMnM0 | 80 to 85 | <1.5 | <1.5 | <0.4 | <0.02 |
| | 1 | FMnM1 | 75 to 80 | <2.0 | <2.0 | <0.4 | <0.02 |
| Low-carbon ferromanganese (LCFeMn) | 0 | FMnL0 | 80 to 85 | <1.0 | <1.5 | <0.35 | <0.02 |
| | 1 | FMnL1 | 75 to 80 | <1.0 | <1.5 | <0.4 | <0.02 |
| Silicon manganese | 0 | SiMn0 | 65 to 70 | <1.5 | 20 to 25 | <0.3 | <0.05 |
| | 1 | SiMn1 | 65 to 70 | <2.0 | 16 to 20 | <0.3 | <0.02 |
| | 2 | SiMn2 | 60 to 65 | <2.0 | 16 to 20 | <0.3 | <0.03 |
| | 3 | SiMn3 | 60 to 65 | <2.5 | 14 to 18 | <0.3 | <0.03 |

Based on JIS G2301: 1998 and JIS G2304: 1998

TABLE 2

| No. | (CaO + MgO)/ (Al$_2$O$_3$ + SiO$_2$) [—] | Agitation power density ε [W/t] | Mn yield η$_{Mn}$ [%] | Remarks |
|---|---|---|---|---|
| 1 | 0.1 | 634 | 69 | Comparative Example |
| 2 | 0.2 | 634 | 70 | Comparative Example |
| 3 | 0.3 | 634 | 75 | Comparative Example |
| 4 | 0.4 | 634 | 80 | Inventive Example |
| 5 | 0.6 | 634 | 81 | Inventive Example |
| 6 | 0.8 | 634 | 82 | Inventive Example |
| 7 | 1.0 | 634 | 84 | Inventive Example |
| 8 | 1.5 | 634 | 85 | Inventive Example |
| 9 | 2.0 | 634 | 85 | Inventive Example |
| 10 | 2.5 | 634 | 86 | Inventive Example |
| 11 | 3.0 | 634 | 85 | Inventive Example |
| 12 | 3.5 | 634 | 84 | Inventive Example |
| 13 | 4.0 | 634 | 83 | Inventive Example |
| 14 | 4.5 | 634 | 82 | Inventive Example |
| 15 | 4.8 | 634 | 81 | Inventive Example |
| 16 | 5.2 | 634 | 75 | Comparative Example |
| 17 | 5.5 | 634 | 72 | Comparative Example |
| 18 | 6.0 | 634 | 70 | Comparative Example |
| 19 | 2.0 | 423 | 80 | Inventive Example |
| 20 | 2.0 | 508 | 81 | Inventive Example |
| 21 | 2.0 | 761 | 89 | Inventive Example |

In this example, the Mn yield is defined by the following equation (10):

$$\eta_{Mn} = W_1/(W_2 + W_3 + W_4) \times 100 \tag{10}$$

Note that, $\eta_{Mn}$ represents the Mn yield (0%); $W_1$ represents the mass (kg) of Mn in a FeMn product; $W_2$ represents the mass (kg) of Mn in HCFeMn molten metal; $W_3$ represents the mass (kg) of Mn added as Mn-containing alloy; $W_4$ represents the mass of Mn added as Mn oxide (kg).

As seen from the result of the decarburization refining shown in Table 2, the Mn yield is at a higher level when the value of (CaO+MgO)/(Al$_2$O$_3$+SiO$_2$) is not less than 0.4 but not more than 5.0 (Nos. 4 to 15 and 19 to 21). On the other hand, when the value of (CaO+MgO)/(Al$_2$O$_3$+SiO$_2$) is less than 0.4 (Nos. 1 to 3) or exceeds 5.0 (Nos. 16 to 18), the Mn yield $\eta_{Mn}$ is at a low level, seemingly because MnO in the slag is not reduced sufficiently. When the cases having the value of (CaO+MgO)/(Al$_2$O$_3$+SiO$_2$) of 2.0 are compared, the Mn yield $\eta_{Mn}$ is at a higher level in some cases (Nos. 9, 20, and 21) when the agitation power density ε of the bottom-blowing gas is not less than 500 W/t than in another case (No. 19) when the agitation power density ε is less than 500 W/t. This is considered due to the fact that when the molten metal is agitated at a proper agitation power density ε, the slag-metal reaction can be promoted to reduce Mn oxide in the slag in a good efficiency for recovery.

In this description, non-SI unit is converted to SI unit by the following conversion numeral:

1 atm=101325 Pa

INDUSTRIAL APPLICABILITY

The technique proposed in the method for producing low-carbon ferromanganese according to the invention can be expanded, for example, in the field of other usual steelmaking refining technique.

REFERENCE SIGNS LIST

1 reaction vessel
2 molten metal
3 lance
4 tuyere
5 pipe for non-oxidizing gas
6 pipe for non-oxidizing gas
7 pipe for oxygen
8 flow control valve
9 additive
10 slag

The invention claimed is:

1. A method for producing low-carbon ferromanganese comprising blowing an oxidizing gas onto a bath face of high-carbon ferromanganese molten metal contained in a reaction vessel provided with a top-blowing lance and bottom-blowing tuyere, from the top-blowing lance for decarburization, wherein
   a slag composition during the blowing is adjusted so that a value of $(CaO+MgO)/(Al_2O_3+SiO_2)$ on a mass basis in the slag composition is not less than 2.5 but not more than 5.0, and
   an agitation gas is blown from the bottom-blowing tuyere to have an agitation power density of not less than 500 W/t.

2. The method for producing a low-carbon ferromanganese according to claim 1, wherein
   an auxiliary material containing MgO is added before the start of the blowing or during the blowing.

* * * * *